UNITED STATES PATENT OFFICE.

FREDERICK CHAMPAGNE, OF MORIAH, NEW YORK, ASSIGNOR OF TWO-THIRDS OF HIS RIGHT TO JAMES S. WINSLOW AND GEORGE W. WATKINS, OF SAME PLACE.

MEDICAL COMPOUND.

SPECIFICATION forming part of Letters Patent No. 231,759, dated August 31, 1880.

Application filed May 8, 1880. (Specimens.)

*To all whom it may concern:*

Be it known that I, FREDERICK CHAMPAGNE, of Moriah, in the county of Essex and State of New York, have invented a new and useful Improvement in Medical Compounds; and I do hereby declare that the following is a full, clear, and exact description of the same.

My invention is a medical compound, intended as a general remedial agent, acting in an invigorating and beneficial manner on the human body, but specially applicable for diseases of the throat and lungs. As a remedy for such diseases it is designed to be taken internally in such quantities and at such intervals as experience or the skill of physicians may prescribe. The compound has also been found beneficial in diseases of liver and kidneys, strengthening and invigorating those organs.

My compound or mixture consists of the ingredients specified below, in proportions stated, viz: one pint of honey, (or in lieu thereof the best molasses,) two ounces of sweet spirits of niter, two ounces of laudanum, one ounce of hemlock-oil, one ounce of juniper-oil, two ounces of linseed-oil, and thirty drops of peppermint-oil. These ingredients are thoroughly mixed by being shaken together, and then are ready for immediate use.

What I claim as my invention, and desire to secure by Letters Patent, is—

The described compound, consisting of honey, sweet spirits of niter, laudanum, oils of hemlock, juniper, linseed, and peppermint, in the proportions specified.

In testimony whereof I have signed my name to this specification in the presence of two subscribing witnesses.

FRED. CHAMPAGNE.

Witnesses:
    GEO. W. WATKINS,
    JAMES S. WINSLOW.